United States Patent
Feuerherm et al.

(10) Patent No.: US 12,168,318 B2
(45) Date of Patent: Dec. 17, 2024

(54) NOZZLE TOOL SYSTEM AND EXTRUSION BLOW MOLDING ARRANGEMENT

(71) Applicant: Max Feuerherm, Troisdorf (DE)

(72) Inventors: Max Feuerherm, Troisdorf (DE); Guenther Kappen, Siegburg (DE); Rolf Kappen-Feuerherm, Troisdorf (DE); Tobias Gruschka-Feuerherm, Troisdorf (DE)

(73) Assignee: Max Feuerherm, Troisdorf (DE)

( * ) Notice: Subject to any disclaimer, the term of this patent is extended or adjusted under 35 U.S.C. 154(b) by 0 days.

(21) Appl. No.: 17/873,290

(22) Filed: Jul. 26, 2022

(65) Prior Publication Data

US 2023/0030461 A1    Feb. 2, 2023

(30) Foreign Application Priority Data

Jul. 27, 2021   (DE) .................... 10 2021 119 460.1

(51) Int. Cl.
| | | |
|---|---|---|
| *B29C 49/04* | (2006.01) | |
| *B29C 49/58* | (2006.01) | |
| *B29C 49/78* | (2006.01) | |
| *B29L 31/00* | (2006.01) | |

(52) U.S. Cl.
CPC ........ *B29C 49/04116* (2022.05); *B29C 49/58* (2013.01); *B29C 49/78* (2013.01); *B29C 2049/5862* (2013.01); *B29L 2031/712* (2013.01)

(58) Field of Classification Search
CPC ... B29C 49/04116; B29C 49/58; B29C 49/78; B29C 2049/5862; B29C 47/20; B29L 2031/712; B29B 11/10
See application file for complete search history.

(56) References Cited

U.S. PATENT DOCUMENTS

| | | | |
|---|---|---|---|
| 6,354,828 B1 * | 3/2002 | Feuerherm | B29C 48/325 |
| | | | 425/465 |
| 10,032,138 B2 * | 7/2018 | Nishikata | B26F 1/0092 |
| 2006/0172028 A1 * | 8/2006 | Arruda | B29C 48/09 |
| | | | 425/192 R |
| 2015/0064302 A1 * | 3/2015 | Feuerherm | B29C 48/09 |
| | | | 425/466 |

FOREIGN PATENT DOCUMENTS

EP      1 023 984 B1    4/2005

* cited by examiner

*Primary Examiner* — Christopher M Rodd
*Assistant Examiner* — Shibin Liang
(74) *Attorney, Agent, or Firm* — Collard & Roe, P.C.

(57) ABSTRACT

A nozzle tool system for extrusion blow molding has an intermediate module and at least first and second nozzle outlet units, each forming an adjustable nozzle outlet gap between a mandrel extending axially and a deformable sleeve. The units can be connected with the intermediate module as replacements for one another, and have a first outlet diameter and a larger second outlet diameter different from one another. At least one setting drive for reversible deformation of the sleeve is arranged on the intermediate module and can be connected with the deformable sleeve by way of a releasable coupling arrangement. The first nozzle outlet unit delimits a first setting path of the setting drive, using at least one inner mechanical stop, and the second nozzle outlet unit delimits a second setting path of the setting drive, greater than the first setting path, using at least one inner mechanical stop.

18 Claims, 12 Drawing Sheets

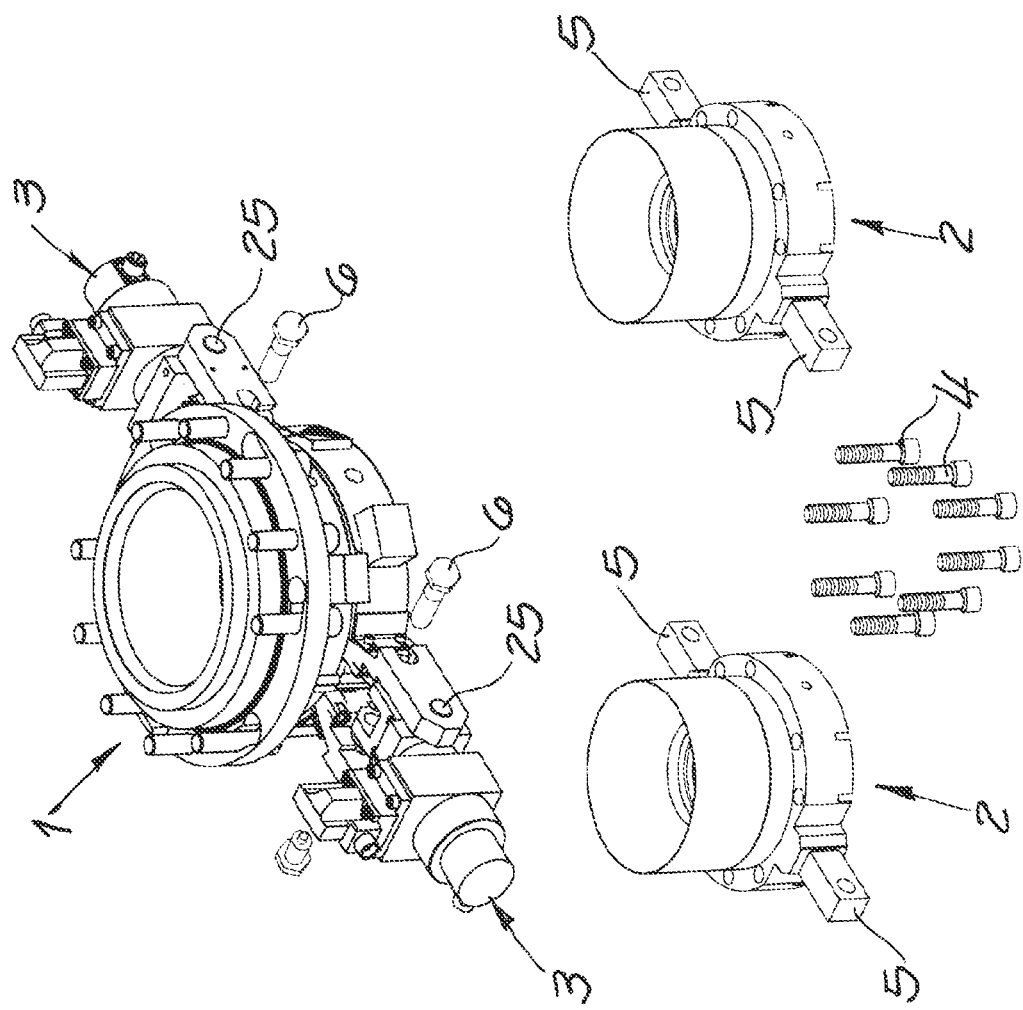

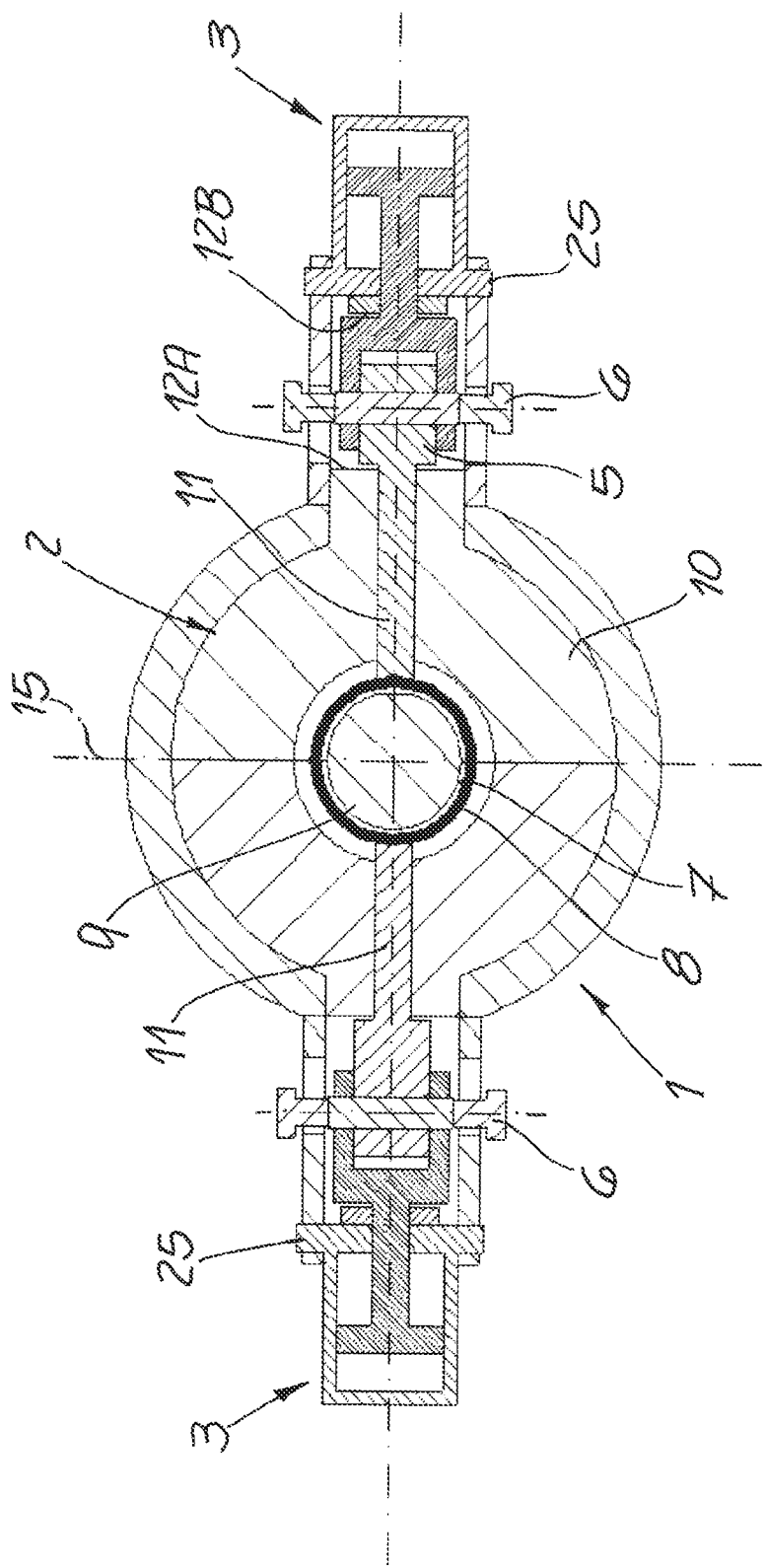

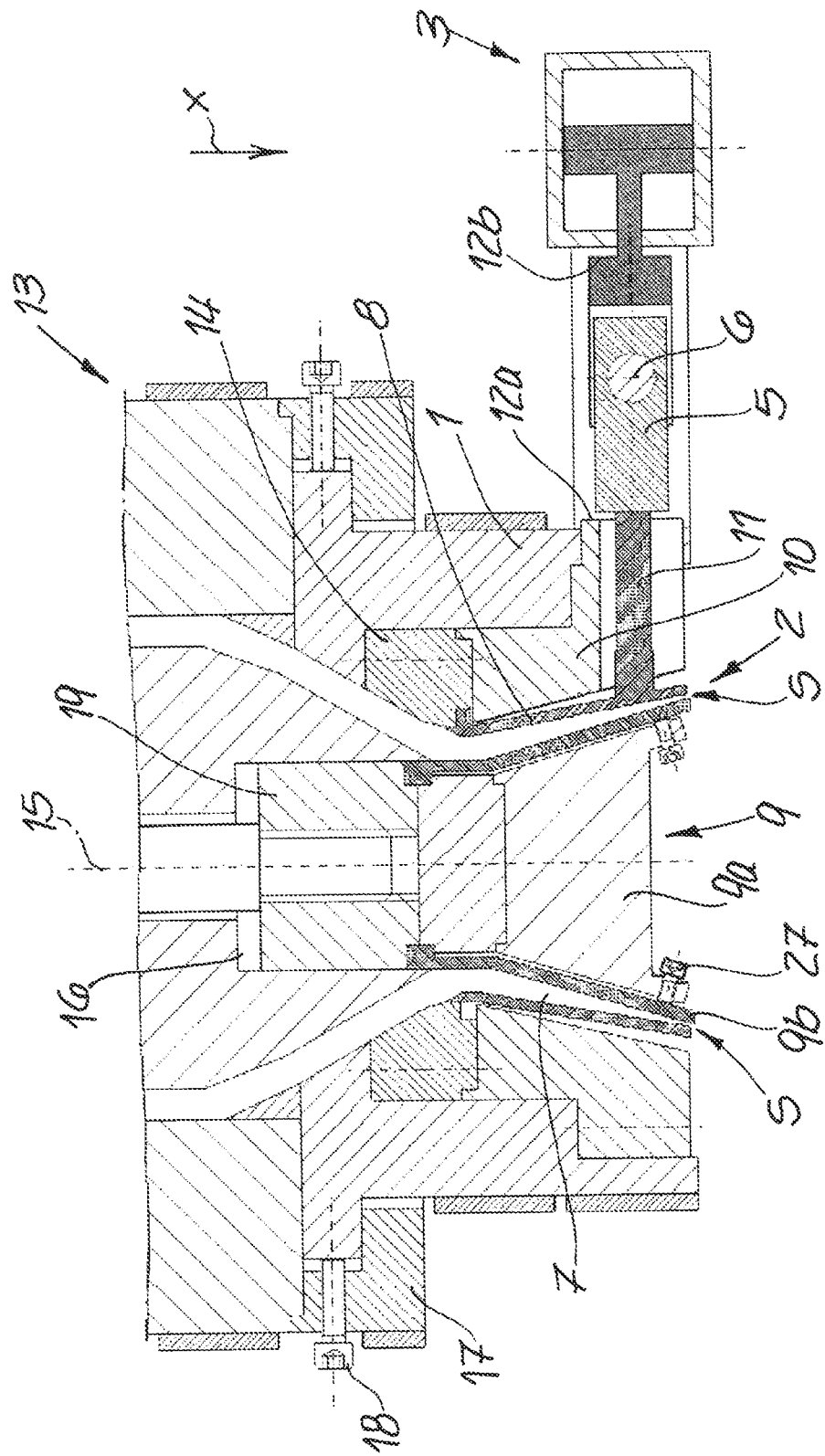

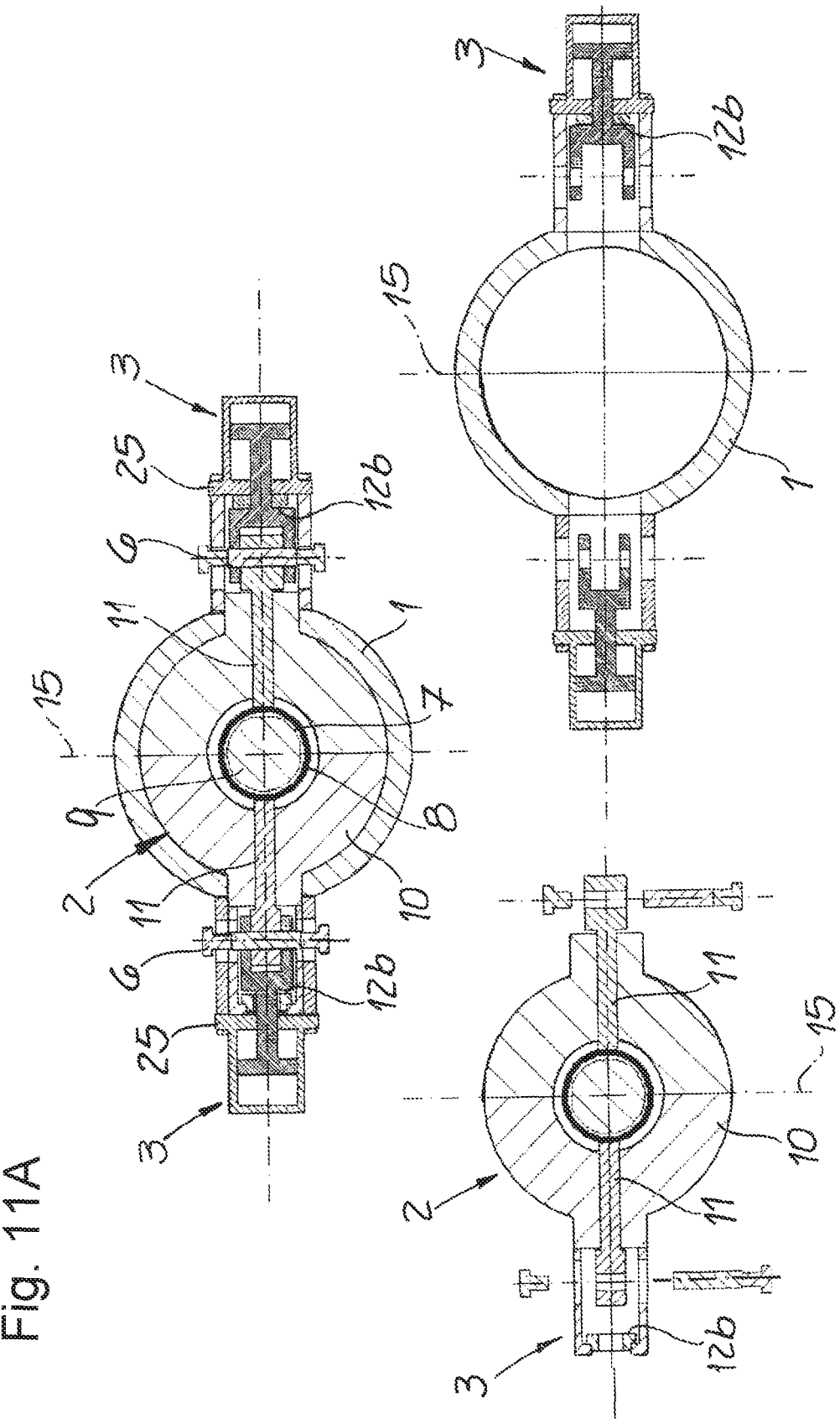

NOZZLE TOOL SYSTEM AND EXTRUSION BLOW MOLDING ARRANGEMENT

CROSS REFERENCE TO RELATED APPLICATIONS

Applicant claims priority under 35 U.S.C. § 119 of German Application No. 10 2021 119 460.1 filed Jul. 27, 2021, the disclosure of which is incorporated by reference.

BACKGROUND OF THE INVENTION

1. Field of the Invention

The invention relates to a nozzle tool system for extrusion blow molding, in particular of plastic containers, having an intermediate module and at least a first nozzle outlet unit and a second nozzle outlet unit, which units each form an adjustable nozzle outlet gap between a mandrel that extends in the axial direction and a deformable sleeve, which units can be connected with the intermediate module as replacements for one another, and which units have a first outlet diameter and a larger second outlet diameter, which diameters are different from one another, wherein at least one setting drive for reversible deformation of the sleeve is arranged on the intermediate module and can be connected with the deformable sleeve by way of a releasable coupling arrangement.

The intermediate module is set up for a connection with an extrusion head of a blow molding arrangement, which is also an object of the invention.

2. Description of the Related Art

The present invention proceeds from an extrusion blow molding arrangement that is described in EP 1 023 984 B1, which conforms to the genre.

Using the extrusion blow molding arrangement, it is possible to form tubular pre-blanks that consist of a thermoplastic plastic melt and are widened to form a plastic container. Forming takes place in a blow mold of the extrusion blow molding arrangement.

In the blow molding process, the pre-blank is widened and thinned in accordance with the blow mold. In order to achieve a uniform wall thickness for the containers produced or, for example, to make available a greater wall thickness in sections that are subject to greater stress, in a targeted manner, and thereby to achieve optimal properties, in total, it is known to already form the tubular pre-blank with a changing wall thickness accordingly. For this purpose, adjustment of the nozzle outlet gap width by means of a relative axial movement between the mandrel and the deformable sleeve is provided, for which purpose the mandrel and/or the deformable sleeve are moved axially. In this regard, control takes place by way of a wall thickness setting program, wherein in addition, in order to influence the radial wall thickness distribution (i.e. around the circumference), the deformable sleeve is used, which is impacted by at least one setting drive. An axial movement of the deformable sleeve usually takes place using further components that hold or carry the deformable sleeve.

The sleeve is preferably elastically deformable, so that free sections between force attack points are subjected to a reproducible displacement that is predetermined by the elasticity, in the case of a deformation of the deformable sleeve at the force attack points.

Corresponding deformations are produced by means of at least one setting drive, within the scope of the invention.

In the case of an introduction of the setting movement into two force attack points that usually lie opposite one another, or in the case of locally fixed support at a force attack point, a single setting drive can be provided for a reversible elastic deformation of the sleeve. Preferably, however, at least two setting drives are provided, which act on force attack points that lie opposite one another, and thereby can deform the sleeve from a usually circular rest position by means of a pressing or pulling movement.

If only one setting drive is provided, which acts on force attack points that lie opposite one another, a suitable mechanical gear mechanism can be provided for transfer of the setting movement, which mechanism comprises a toggle lever arrangement, for example.

By means of the measures described, it is possible to transform the nozzle outlet gap into an elongated or swaged oval shape, in order to optimize the radial wall thickness distribution with regard to the plastic container to be formed. The displacement of the plastic melt along the connection line of the two force attack points, on the other hand, is possible by means of a movement, in the same direction, of two setting drives that lie opposite one another, wherein depending on the requirements, in each instance, the different movement components, in the same direction or opposite directions, can be freely combined.

For a more far-reaching adjustment of the nozzle outlet gap width around the circumference, fundamentally also more than two relative setting drives can be provided, wherein, for example, four setting drives can be arranged in an angle spacing of 90°.

By means of the wall thickness control as described, it is not only possible to set a suitable wall thickness distribution in the case of the tubular pre-blank. Furthermore, it is also possible, to a certain extent, to obtain an adaptation to different shapes and, if applicable, also different sizes of blow molded parts, by means of modification of the corresponding controller.

If, however, two blow molded parts having significantly different cross-sectional dimensions are to be produced on the extrusion blow molding arrangement, two different nozzle tools having different outlet diameters are required for a resource-saving blow molding process, which tools must be installed in the extrusion blow molding arrangement, put into operation, and set or optimized for production, in accordance with their use.

In this connection, a multi-part embodiment is proposed according to EP 1 023 984 B1, wherein an upper nozzle part remains on the extrusion head as an intermediate module, and wherein in order to make available a first outlet diameter and a larger second outlet diameter, a first nozzle outlet unit and a second nozzle outlet unit are provided accordingly, each of which units has a reversible deformable sleeve and a related mandrel.

The setting drives are then arranged on the upper nozzle part as an intermediate module, so that the setting drives, together with the intermediate module, can also remain on the extrusion head.

According to FIGS. 3 and 11 of EP 1 023 984 B1, a greater second outlet diameter can be achieved by means of lengthening the mandrel and the deformable sleeve along the axial direction, proceeding from the configuration shown. In the case of a corresponding conversion, extensive setup measures cannot be avoided.

SUMMARY OF THE INVENTION

Against this background, the present invention is based on the task of making it possible to make different outlet diameters available more quickly, more easily, and more reliably.

Nozzle tool systems are the object of certain aspects of the invention and the solution for the task, wherein the characterizing features, in each instance, are also particularly preferably provided in combination with one another. The invention furthermore comprises an extrusion blow molding arrangement having an extrusion head and the aforementioned nozzle tool system.

Proceeding from a nozzle tool system for extrusion blow molding, having an intermediate module and at least a first nozzle outlet unit and a second nozzle outlet unit, which units each form an adjustable nozzle outlet gap between a mandrel that extends in an axial direction and a deformable sleeve, which units can be connected with the intermediate module as replacements for one another, and which units have a first outlet diameter and a larger second outlet diameter, which diameters are different from one another, wherein at least one setting drive for reversible deformation of the sleeve is arranged on the intermediate module and can be connected with the deformable sleeve by way of a releasable coupling arrangement, it is provided, according to a first aspect of the invention, that the first nozzle outlet unit delimits a first setting path of the at least one setting drive, by means of at least one inner mechanical stop, and the second nozzle outlet unit delimits a second setting path, which is greater than the first setting path, of the at first one setting drive, by means of at least one inner mechanical stop.

The inner mechanical stops of the first nozzle outlet unit as well as of the second nozzle outlet unit can be configured for a pressing setting movement of the at least one setting drive, by means of a contact surface, in each instance, of the corresponding nozzle outlet unit.

The invention is based, with reference to the first aspect, on the recognition that different setting paths, i.e. even maximal deformations are also possible for nozzle outlet units having different design parameters and, in particular, having a different outlet diameter.

In the case of a design embodiment that is otherwise the same or essentially the same, a greater second setting path can also be implemented in the case of the second outlet diameter, which is greater as compared with the first outlet diameter, without the related deformable sleeve being overly stressed or damaged.

Against this background, it is also provided that the corresponding deformable sleeve is protected during operation, against an overload and/or damage, by means of the first setting path or the second setting path, wherein a very great measure of safety results from the mechanical restriction of the setting paths. Since the corresponding setting path is predetermined by means of at least the inner mechanical stop, the switch between the first nozzle outlet unit and the second nozzle outlet unit is significantly facilitated, because no stops need to be changed, adapted or set, in a complicated manner.

Preferably the setting paths are restricted, in each instance, by means of the inner mechanical stop and an outer mechanical stop. Fundamentally, the outer mechanical stop can also be made available, in the case of a suitable design embodiment, by means of the first nozzle outlet unit or the second nozzle outlet unit.

In contrast, however, it is also possible, and preferred within the scope of the invention, that an outer mechanical stop is assigned to the intermediate module for a pulling setting movement.

Depending on the design embodiment, in this regard the outer mechanical stop can be regarded as a type of fixed point, wherein then the permissible setting path, in each instance, can be established by means of the different position of the inner mechanical stop in the case of the first nozzle outlet unit and the second nozzle outlet unit. Accordingly, a center position of the deformable sleeves of the first nozzle outlet unit, on the one hand, and of the second nozzle outlet unit, on the other hand, then also results for both setting paths, at different setting positions of the at least one setting drive.

During installation, the connection of the deformable sleeve with the at least one setting drive preferably takes place in the center position, when the deformable sleeve is then free of forces. Proceeding from the center position, which relates to the force-free state of the deformable sleeve, different permissible partial setting paths can result at the force attack points for a pulling movement and a pressing movement, so that then the center position does not correspond to the center of the total setting path.

Since retooling for different outlet diameters can already take place more easily, more quickly, and more reliably within the scope of the invention, according to the first aspect, the intermediate module is also referred to as a quick-change holder within the scope of the invention.

In this regard, it is preferably also provided that the at least two different nozzle outlet units are connected with the intermediate module in the same manner, and have a conforming interface or connection design for a connection with the intermediate module, in particular on the inlet side.

In the case of the transition between the intermediate module and the nozzle outlet units, a permanently reliable seal of the melt-conducting flow channel must be made available. Furthermore, edges, steps, gaps or comparable free spaces and interstices as well as rheologically disadvantageous transitions should be avoided at the transition, since these can impair the flow properties of the plastic melt.

As has already been explained above in connection with the state of the art, two setting drives that lie opposite one another are provided according to a preferred embodiment of the invention, both of which drives are assigned to the intermediate module in the manner described. As will also still be described further below, the at least one setting drive can be fixed in place on the intermediate module or can be movable with reference to a basic body of the intermediate module.

With regard to the first aspect of the invention, it is decisive that in the case of replacement, the first nozzle outlet unit and the second nozzle outlet unit are connected with the same setting drive or the same setting drives, wherein a manual adjustment of the setting path and, in particular, of the permissible setting path is not necessary.

For each product to be produced as a blow molded part, a suitable wall thickness setting program should be provided, wherein in the case of an embodiment having two setting drives, for example, these drives can be controlled independently of one another, by an assigned program profile, in each instance. The setting drives can perform the same or different setting strokes during extrusion of a pre-blank, as a function of the program profiles. Control of the setting drives can take place, for example, by way of a servo-hydraulic drive or also a servo-electric drive.

Optionally or preferably in addition to the first aspect as described above, it is provided, in accordance with a second aspect, that the first nozzle outlet unit and the second nozzle outlet unit extend along the axial direction, over the same height, with reference to the corresponding nozzle outlet gap.

In this regard, it should be noted that a first partial height is predetermined between a connection plane of the intermediate module and the nozzle outlet units, on the one hand, and the position of the at least one setting drive, on the other hand. A second partial height then relates to the distance between the at least one setting drive along the axial direction and the corresponding nozzle outlet gap.

For different designs, in this way the technical layout of the nozzle tool system itself or also of components that interact with it can be simplified.

In this connection, it should be noted that the deformable sleeve is mounted at an end that faces in the direction of the extrusion head, according to one possible embodiment, while it is practical if the force attack points for the deformation movement of the deformable sleeve are arranged close to the nozzle outlet gap, with reference to the axial direction.

In this way, the result can be achieved that the actual adjustment at the corresponding nozzle outlet gap at the force attack points approximately corresponds to the travel of the setting drive that is in effect there, in each instance. Because—as has been described—the first partial height has been established, the distance between the force attack points and the nozzle outlet gap would change along the axial direction in the case of a different height of the first nozzle outlet unit and the second nozzle outlet unit, so that depending on the geometry, complicated corrections can be necessary so as to be able to determine the movement at the nozzle outlet gap itself from the travel of the at least one setting drive.

Even if the force attack points are arranged close to the nozzle outlet gap, the travel of the setting drive that is in effect at the force attack points does not precisely correspond to the actual adjustment at the nozzle outlet gap. In the case of predetermined geometry, however, these values can be converted to one another. If, according to the second aspect, the height and thereby usually also the second partial height for the first and second nozzle outlet unit are the same, the same conversion is obtained for both nozzle outlet units.

Also, in the case of a different mounting of the deformable sleeve, the same height of the first nozzle outlet unit and the second nozzle outlet unit as provided according to the second aspect of the invention can be advantageous.

The deformable sleeve can also be held in a horizontally displaceable manner, for example, even without a mounting in the sense of a clamped mounting.

In the case of a horizontally displaceable holder, the deformation of the deformable sleeve can be implemented by means of a purely linear movement. In the case of a mounting of the deformable sleeve at one of its ends, in contrast, a tilting movement must also be paid attention to during deformation, which movement must be balanced out by means of a suitable movable connection of the at least one setting drive.

By means of establishing the same height for the first nozzle outlet unit and the second nozzle outlet unit, an adaptation of the flow cross-sections within the nozzle outlet units might have to be provided for rheological reasons. In this regard, it should also be noted that within the scope of the invention, the mandrel and/or the sleeve can usually be moved along the axial direction, by means of a setting movement regulated by an electronic controller, in order to make available a part of the wall thickness controller described above.

Thus, for example, it can be provided that the mandrel of the first nozzle outlet unit and the mandrel of the second nozzle outlet unit have a different diameter at a rear-side guide shaft section, wherein an adapter sleeve is provided for an equalization of the different diameter. Additionally, or alternatively, a diameter reduction can also be provided, at first, on the mandrel itself, proceeding from the rear-side guide shaft section.

A third aspect of the present invention, provided in addition to or alternatively to the first aspect, as well as in addition to or alternatively to the second aspect, relates to a setting relative to the extrusion head in the sense of a pre-setting.

In this connection, it is known from practice that nozzle tools have setting means with which the radial nozzle outlet gap progression can be changed over the circumference, by means of a change in position of a nozzle ring relative to a mandrel, which generally is not displaceable in the radial direction.

According to the state of the art, such a pre-setting usually takes place by means of displacement in a plane perpendicular to the axial direction or tilting or by means of pivoting relative to the axial direction.

Within the scope of the invention, it can be provided, against this background, that the intermediate module, as a quick-change holder, is adjustable relative to the extrusion head by means of suitable setting means, for example centering screws. Then, however, a position adjustment might be necessary when the nozzle outlet unit is replaced.

Against this background, it is provided, according to the third aspect of the invention, that the first nozzle outlet unit and the second nozzle outlet unit each have adjusting means for static pre-positioning of the deformable sleeve relative to the intermediate module and thereby also relative to the mandrel. The pre-positioning described is then more or less a component of every nozzle outlet unit, so that corresponding adjustments and precise adjustments are no longer necessary during a replacement of the nozzle outlet units, which have already been correctly pre-set, considered by themselves. In this regard, it should be noted that in practice, pre-positioning, specifically, can be extremely demanding, and can also be greatly dependent on the experience and the skill of the person performing the adjustment.

If, therefore, adjustment means are provided for static pre-positioning of the deformable sleeve on the first and second nozzle outlet unit, according to the third aspect of the invention, the intermediate module can certainly be attached to the extrusion head in a non-adjustable manner and, if necessary, also with precisely reproducible centering. Even in the case of replacement or maintenance of the intermediate module, an incorrect orientation of the intermediate module relative to the extrusion head can then always be excluded.

According to the third aspect of the invention, no specific pre-positioning is provided or necessary between the intermediate module, on the one hand, and the extrusion head, on the other hand. In contrast, a corresponding correction is provided on the nozzle outlet units themselves, which merely have to be inserted into the intermediate module in the correct position.

Similar to the embodiments known from practice, the first nozzle outlet unit and the second nozzle outlet unit can be adjustable, relative to the intermediate module, in a plane perpendicular to the axial direction or by means of tilting or by means of pivoting relative to the intermediate module.

Specifically with regard to the simplest possible embodiment and retooling, it can then be practical if the at least one setting drive is arranged to be movable relative to a basic body of the intermediate module, even if the setting drive always remains on the intermediate module in the case of a replacement of the nozzle outlet unit.

For example, it can be provided that the intermediate module comprises a support ring that can be moved, relative to the basic body, in a plane perpendicular to the axial direction, which ring carries the at least one setting drive. The pre-positioning provided for in the case of every nozzle outlet unit can then be balanced out by means of the mobility of the support ring.

In this regard, it also lies within the scope of the invention to couple the support ring assigned to the intermediate module with the nozzle outlet unit used in the intermediate module, in each instance, in such a manner that the support ring is correspondingly moved along in the case of a change in the static pre-positioning.

Usually, the deformable sleeve and the adapted mandrel assigned to it, in each instance, are separately attached to the intermediate module and to a mandrel holder, respectively. Couplings and connections can also be provided for the mandrels to be exchanged for one another then, in the case of a replacement of the nozzle outlet units, which couplings and connections allow simple, reliable, and rapid replacement. For example, a bayonet closure can be provided as a quick-change coupling.

A bayonet closure or a comparable quick-change coupling is also a possibility between the intermediate module and the nozzle outlet unit.

It is understood that depending on the use and requirements, an entire mandrel or also only a mandrel section, for example a front mandrel section that delimits the nozzle outlet gap, can be replaced. Replacement of only a mandrel section is particularly possible if the two nozzle outlet units do not differ too greatly with regard to the diameter of the nozzle outlet gap as well as further parameters. In addition or alternatively, the adapter sleeve already explained above can also be used for adaptation to different mandrels.

The mandrels can be structured, particularly in the region of the nozzle outlet gap, without restrictions, so as to be rigid, i.e. in general in one piece, or also to be adjustable, for example with a basic body and an adjustable ring or an adjustable sleeve. In particular, the adjustable sleeve can be adapted and pre-set for the corresponding application case, using setting screws or other setting means. Fundamentally, dynamically controlled setting using suitable setting means is a possibility.

As is known to a person skilled in the art, dynamic adjustment of the nozzle outlet gap width by means of an axial relative movement between the mandrel and the deformable sleeve is also provided within the scope of the invention, for which purpose the mandrel and/or the deformable sleeve is/are moved axially. In this regard, control of the axial movement takes place by way of a wall thickness setting program. In addition, the deformable sleeve is used for influencing the radial wall thickness distribution (i.e. around the circumference). In order to move the deformable sleeve, an outer ring section of the extrusion head with the intermediate module connected with it, as well as the nozzle outlet unit, can be moved as a module connected with one another. Fundamentally the movement necessary for control of the nozzle outlet gap width can alternatively also be produced at an interface between the extrusion head and the intermediate module or also between the intermediate module and the nozzle outlet unit.

The nozzle tool system according to the invention can have a third nozzle outlet unit as a further component, which has a rigid, i.e. non-adjustable sleeve or statically adjustable sleeve that delimits the nozzle outlet gap. An essential aspect of the present invention lies in that the first and the second nozzle outlet unit can be easily replaced for one another, and interact with the same at least one setting drive that is assigned to the intermediate module. Proceeding from this, the third nozzle outlet unit represents a supplement for the overall system, having a simplified functionality. When using the third nozzle outlet unit, the at least one setting drive remains unused.

Within the scope of the invention, making available different outlet diameters is achieved in a faster, simpler, and more reliable manner by means of replacement of the nozzle outlet units on the intermediate module. In this regard, not only different mechanical stops but usually also different settings are provided for the different nozzle outlet units. Thus, for example, it can be provided that the mechanical stops are provided merely as a backup, while during usual operation, end positions that lie in front of the mechanical stops are stored in a data memory of the controller. Further parameters and settings can also be provided specifically for each nozzle outlet unit. This can also include, for example, permissible setting speeds and the position at which the at least one setting drive must be connected with the deformable sleeve.

It is practical if specific and at least partially different parameters are stored in the data memory of the controller for the first and the second nozzle outlet unit. In this regard, a change in the nozzle outlet unit of the controller can be transmitted in different ways. Manual input by a user is conceivable, wherein then, however, incorrect operation cannot be fundamentally precluded. However, even for such cases damage can be prevented by means of the mechanical stops that are individually defined, in each instance, for each nozzle outlet unit.

According to a preferred further development of the invention, the at least two nozzle outlet units have identification means that allow a differentiation. In the simplest case, this can be a part number, a nameplate and/or a serial number, wherein reliable identification by a user is possible in this way, and the risk of incorrect operation is at least reduced.

In addition, or alternatively, identification means can also be provided, which allow automatic identification using the controller. Taking into consideration the usual conditions of use of the nozzle outlet units and, in particular, comparatively high temperatures, against this background identification means having a simple design are advantageous. For example, simple robust switches or shaped parts in the manner of cams, openings or slots can be provided, which can then be read using suitable reading means. Multiple switches or shaped parts can also allow coding, in this regard. As an example, multiple cams, projections, depressions or the like provided on the nozzle outlet units can interact with switches on the intermediate module, so as to allow clear automatic recognition. Optical recognition with slots, notches, holes or the like can be implemented in a simple and robust manner.

According to the invention, at least two nozzle outlet units that can be exchanged for one another are provided. Of course, within the scope of the invention, any number of nozzle outlet units can also be provided, so as to allow easy and fast retooling. A system formed in this manner can also be changed in any desired manner afterwards and, in particular, can be expanded.

Fundamentally, two nozzle outlet units having the same outlet diameter or even having the same design can be provided within an overall system, which units differ, for example, by means of a specific pre-setting for a specific product. The specific pre-settings particularly include static settings on an adjustable mandrel, for example, or also an adjustment according to a third aspect of the present invention. Then no setting work or at least less setting work is necessary when the product to be produced is replaced.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 shows a nozzle tool system according to the invention, having an intermediate module and two nozzle outlet units that can be exchanged for one another, FIG. 2A shows the intermediate module having a first nozzle outlet unit, in a horizontal section, FIG. 3 shows a vertical section through a nozzle tool, FIG. 6 to FIG. 11C show alternative embodiments of the nozzle tool.

DETAILED DESCRIPTION OF PREFERRED EMBODIMENTS

Figure 2B:
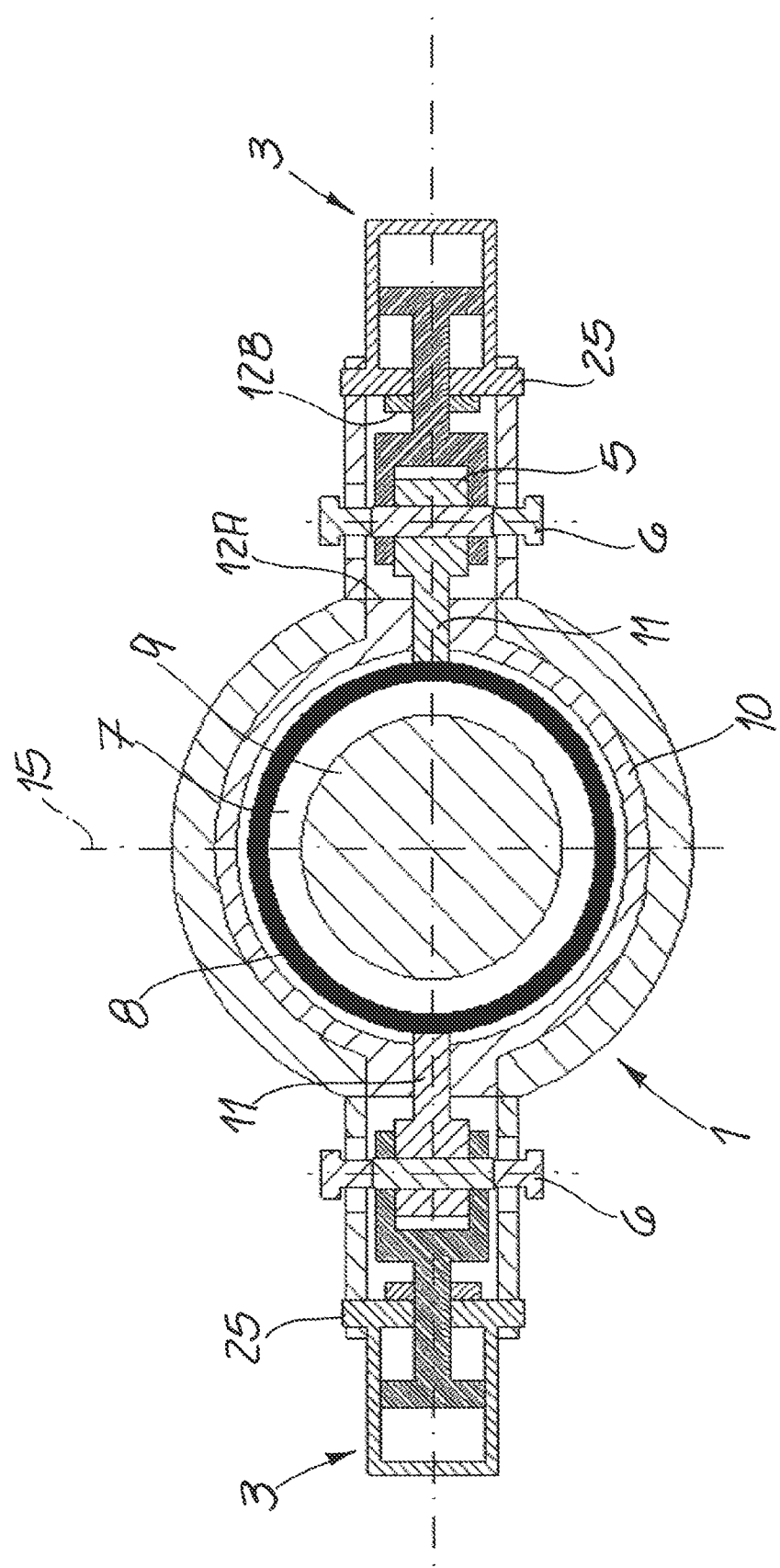
FIG. 2B shows the intermediate module having a second nozzle outlet unit, in a horizontal section.

FIG. 1 shows a nozzle tool system for extrusion blow molding of plastic containers, in a disassembled state, which system comprises an intermediate module 1 and two nozzle outlet units 2.

In the general representation of FIG. 1, the two nozzle outlet units 2 are shown as being the same. However—as will be described in detail below—they have different outlet diameters.

According to FIG. 1, it is furthermore evident that two setting drives 3 that lie opposite one another are arranged on the intermediate module 1. The two nozzle outlet units 2 can be used in the intermediate module 1, using fastening screws 4, in exchange for one another. Furthermore, connection elements 5 of the nozzle outlet units 2 can be connected with the setting drives 3 using connection bolts 6.

In order to replace the nozzle outlet units 2, all that needs to happen is that the fastening screws 4 and the connection bolts 6 are loosened and fastened again.

FIG. 2A and FIG. 2B show, in a highly schematic manner, a horizontal section through the intermediate module 1, with an inserted nozzle outlet unit 2, in each instance, wherein it is already indicated that different outlet diameters are made available.

According to FIGS. 2A and 2B, a flow channel 7 that opens into a nozzle outlet gap S is formed between a deformable sleeve 8 and a mandrel 9. As is also evident from the further following figures, the sleeve 8 according to FIGS. 2A and 2B is surrounded by a lower holding body 10 in the horizontal section plane shown.

The connection element 5 shown in FIG. 1 makes a transition, at a step, into a rod section 11 that defines a force introduction point on the sleeve 8.

In order to reliably protect the sleeve 8 against overload and damage, independent of a programmed controller, mechanical stops 12A, 12B are provided, which delimit a setting path. When looking at FIG. 2A and FIG. 2B in comparison, it is evident that setting paths of different sizes are made available.

When, according to FIG. 2A, a smaller outlet diameter is made available using a correspondingly small sleeve 8, a first smaller setting path is provided. The inner stop 12A, which delimits a pressing movement, is formed by the lower holding body 10 as a component of the corresponding nozzle outlet unit 2. The outer mechanical stop 12B, in contrast, is formed on the setting drive 3 and thereby assigned to the intermediate module 1.

For the larger outlet diameter, a corresponding restriction of a second setting path is formed in connection with the second nozzle outlet unit 2 shown in FIG. 2B, wherein the second setting path is greater. This is achieved in that the inner mechanical stop 12A is offset inward in the radial direction by means of a corresponding configuration of the lower holding body 10.

By making the outer mechanical stop 12B available on the setting drive 3, this stop forms a reference point or fixed point for the different nozzle outlet units 2, with regard to the setting path.

In FIG. 2A and FIG. 2B, the elastically deformable sleeve 8 is shown in the non-deformed state, i.e. in a force-free middle position.

By means of fixing the outer mechanical stop 12B in place on the setting drive 3, as well as the different setting path, a different center position also results from this.

It is practical if assembly of a total nozzle outlet unit takes place in the center position, so that then usually the setting drives 3 must be moved accordingly.

FIG. 3 shows a vertical section through an intermediate module 1 connected to an extrusion head 13, with a nozzle outlet unit 2 held in the module.

In the exemplary embodiment shown, the nozzle outlet unit comprises an upper holding body 14 and the lower holding body 10, which hold the sleeve 8 on its upper end. Close to a lower end of the sleeve 8, the rod section 11 is set on, in particular with material fit or material fit, wherein the rod section 11 makes a transition into the connection element.

The sectional representation according to FIG. 3 is angled away by 90° on a center axis 15. In this connection, FIG. 3 also relates to an embodiment having two setting drives 3 that lie opposite one another, as these are shown in FIGS. 2A and 2B.

If a different outlet diameter is supposed to be made available within the scope of the invention, it is only necessary to replace the nozzle outlet unit 2, while the intermediate module 1 remains on the extrusion head as a quick-change apparatus. The nozzle outlet unit 2 furthermore also comprises the mandrel already described above, which is held in a mandrel holder 16 of the extrusion head 13 along an axial direction X.

According to FIG. 3, the intermediate module 1 is fastened to the extrusion head 13 using a holding ring 17, wherein the intermediate module 1 can be adjusted relative to the extrusion head 13, in a plane perpendicular to the axial direction X, by means of setting means 18 in the form of screws. With reference to the mandrel 9 held in the mandrel holder 16 of the extrusion head 13, pre-positioning of the deformable sleeve 8 relative to the mandrel 9 therefore takes place, and thereby the width of the nozzle outlet gap S can be pre-adjusted around the circumference. In other words, a precisely centered placement or also an intentionally off-center placement of the mandrel 9 within the elastic sleeve 8 can be achieved by means of activation of the setting means 18.

However, it is a disadvantage in this regard that when replacing the nozzle outlet unit, usually separate pre-positioning is necessary or at least practical.

Figure 4:
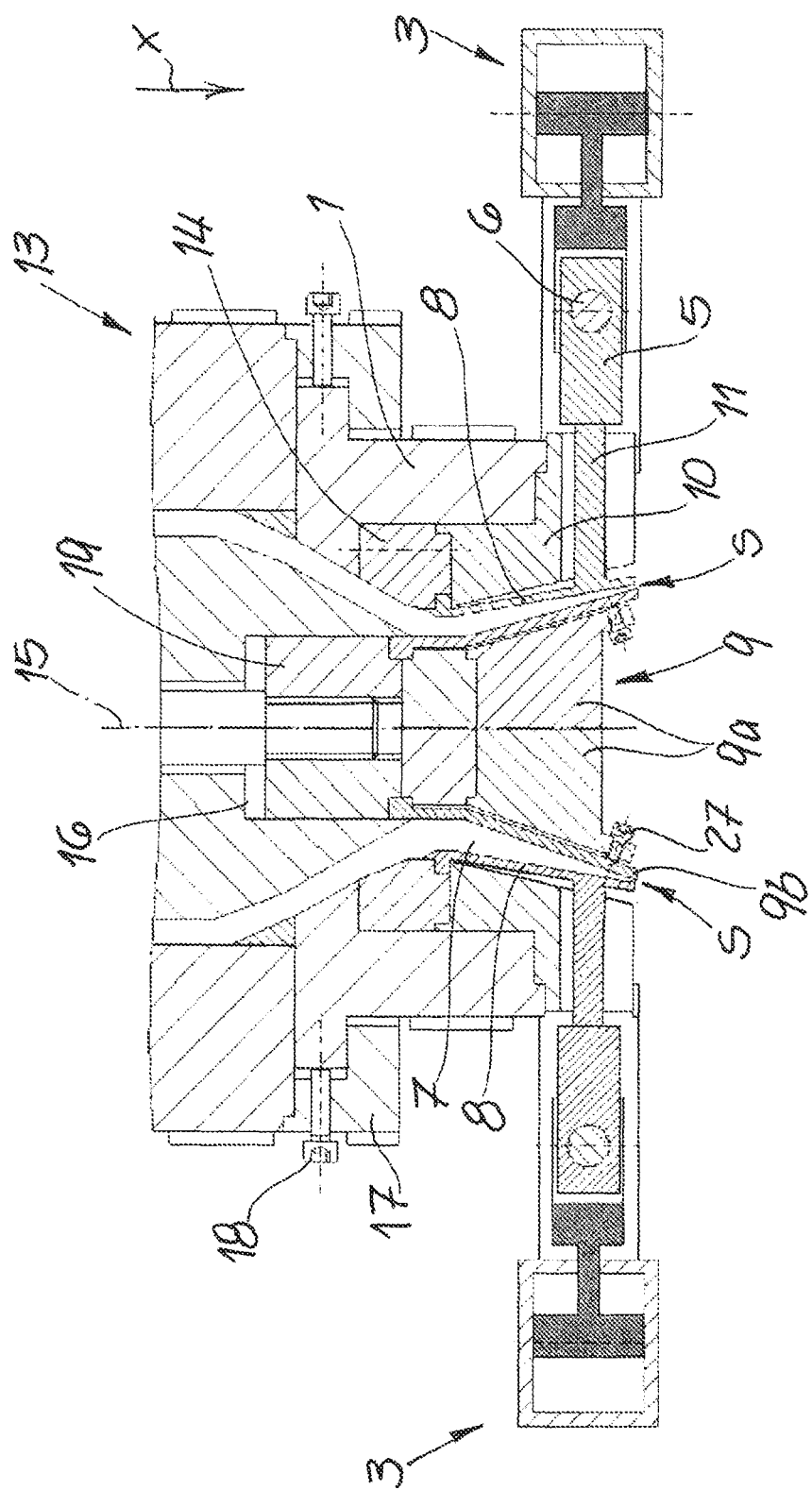
FIG. 4 shows a view according to FIG. 3, with a comparison of a small diameter on the right side of a center axis and a large diameter on the left side of the center axis.

FIG. 4 shows, in a vertical section, the comparison, as an example, for a first outlet diameter on the right side of the center axis 15 and a larger second outside diameter on the left side of the center axis 15, wherein reference can be made to the above explanations with regard to the design embodiment and the assignment of the components.

From FIG. 4, it is furthermore evident that in spite of different outlet diameters, it is provided, according to a preferred embodiment of the invention, that the at least two nozzle outlet units 2 extend over the same height, along the axial direction X, with reference to the corresponding nozzle outlet gap S.

In this regard, the advantage occurs that independent of the outlet diameter, the force introduction points are formed close to the lower end of the sleeve 8, so that the movement of the setting drives 3 also approximately corresponds to the travel of the sleeve 8 at its lower end. There is generally a lesser need for adjustment also for downstream devices of the extrusion blow molding arrangement, such as sensors or the like, for example, due to the same height of the nozzle outlet units 2.

It can already be seen in FIG. 4 that the flow paths within the nozzle tool can change significantly, specifically due to the requirement of an equal height, independent of the outlet diameter.

When designing the flow channel geometry of the intermediate module 1 and of the nozzle outlet units 2, the rheological requirements that result from the flow behavior of the plastic melt must be taken into account. One of these requirements is usually the continuous cross-section reduction of the flow channel toward the nozzle outlet gap S. This requirement must be fulfilled even in the case of differently large nozzle outlet gaps S or outlet diameters, and decisively determines the maximally usable relative travel between the nozzle outlet unit 2 or the deformable sleeve 8, on the one hand, and the mandrel 9, on the other hand.

Figure 5:
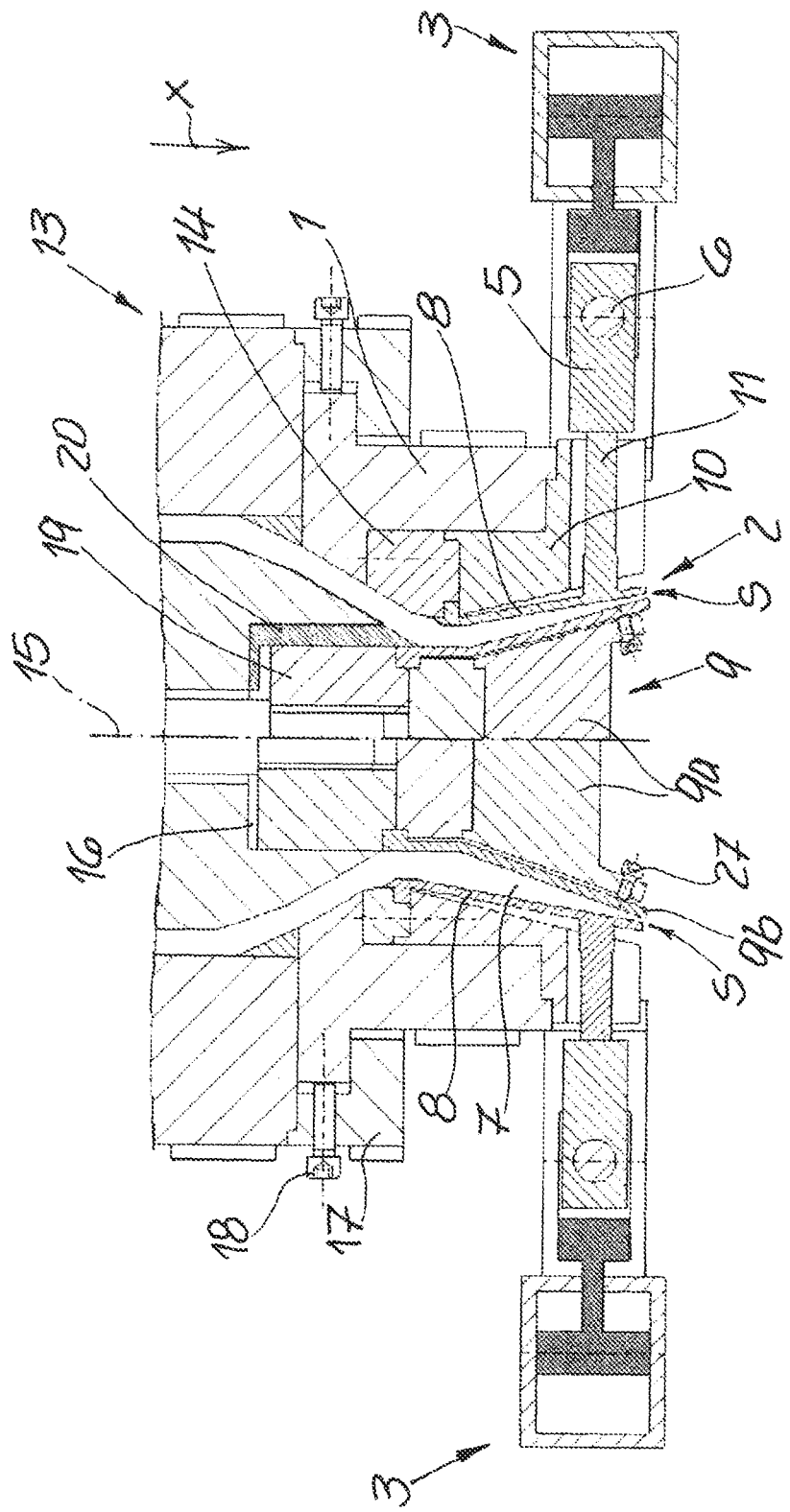
FIG. 5 shows a view according to FIG. 4 for an alternative embodiment.

In this connection, FIG. 5 also shows a larger outlet diameter on the left side of the center axis 15 than on the right side. For rheological reasons, it can then be practical if, in spite of the same total height, the sleeves 8 provided for the different nozzle outlet units 2 themselves have a different height.

Furthermore, it can also be practical to provide different diameters on a rear-side guide shaft section 19 of the mandrel 9 provided, in each instance, wherein an adapter sleeve 20, for example, is practical for equalization. The mandrel 9 then performs its longitudinal movement within the adapter sleeve 20, which also delimits and forms a part of the flow channel for the plastic melt, in a suitable form.

Figure 6:
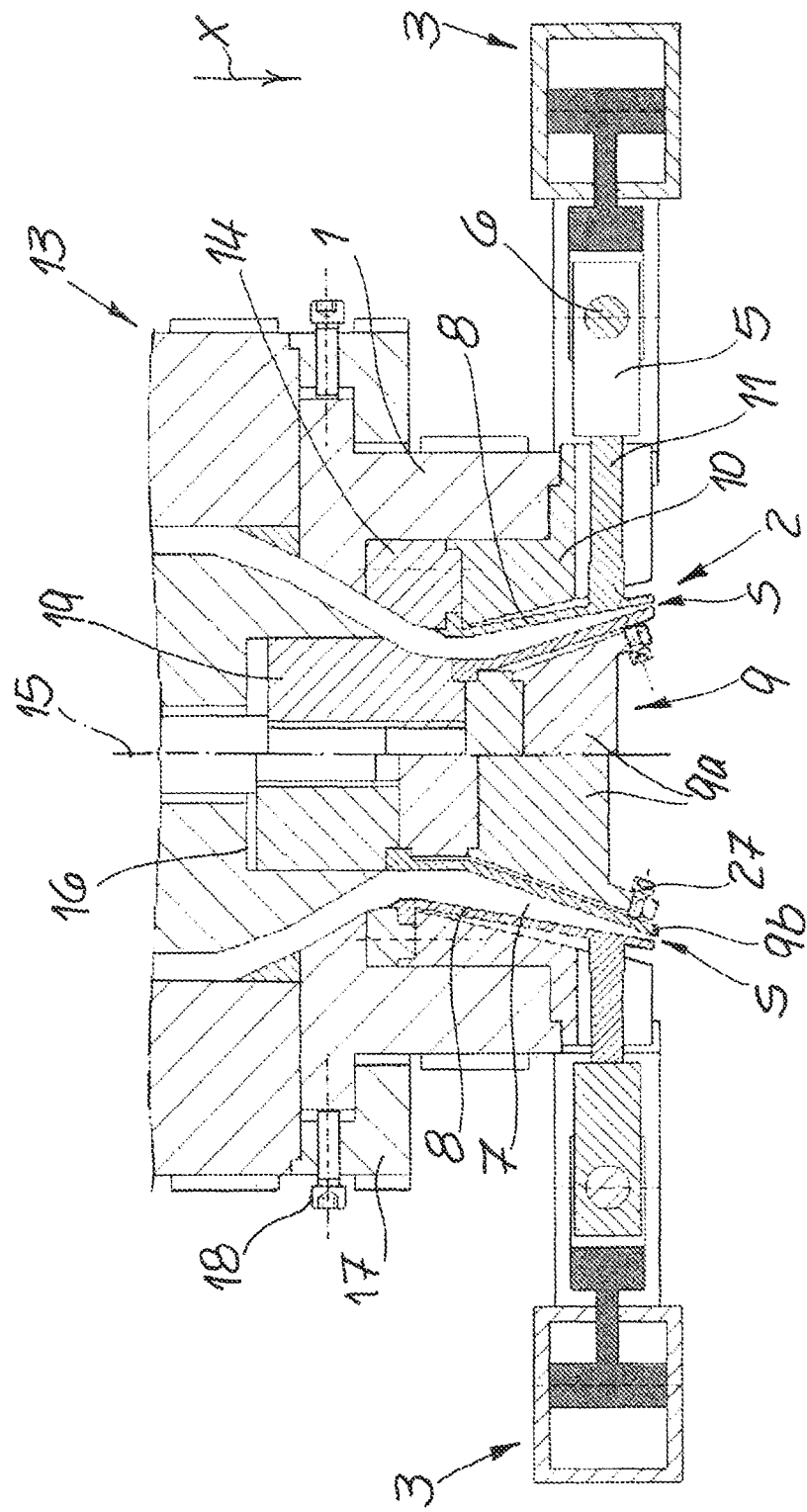

In order to form the flow channel in a suitable manner, a diameter reduction can also be provided alternatively, at first, proceeding from the guide shaft section 19, as is shown as an example in FIG. 6.

Figure 7:
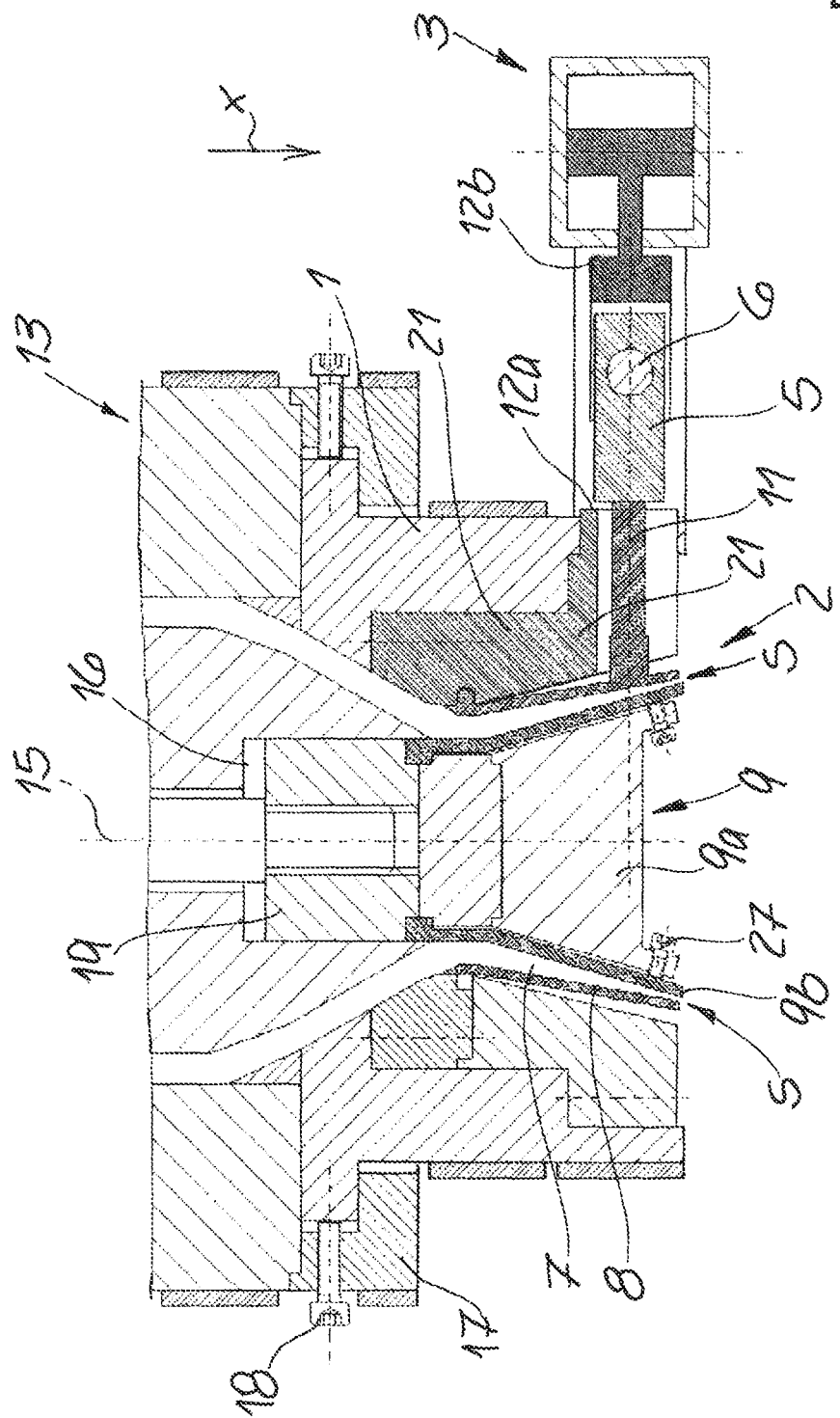

The representation of FIG. 7 corresponds, on the left side, to the center axis 15 of FIG. 3. On the right side, in contrast, it is shown that the sleeve 8 can also be held by a one-piece holding body 21, wherein then the sleeve 8 can be held in the one-piece holding body 21 by means of a type of bayonet closure.

Figure 8:
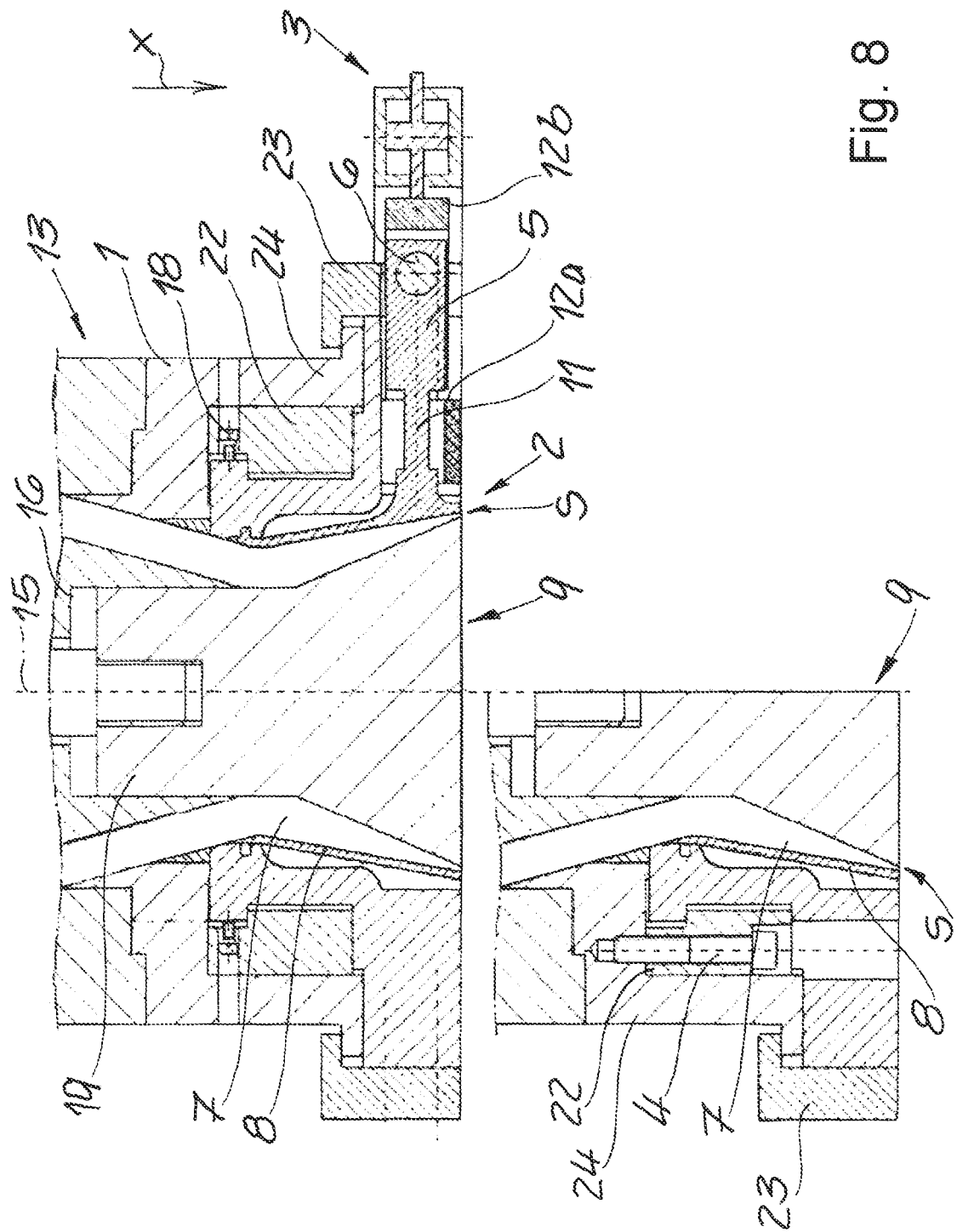

Finally, FIG. 8 shows a further embodiment, in which the pre-positioning previously described in connection with FIG. 3 is implemented not between the extrusion head 13 and the intermediate module 1, but rather on the replaceable nozzle outlet units 2. For this purpose, the nozzle outlet units 2 have a ring-shaped centering unit 22 having setting means 18, around the one-piece holding body 21.

Since the centering unit 22 according to FIG. 8 is additionally a component of the nozzle outlet unit 2, generally no renewed pre-positioning needs to be undertaken in the case of replacement of the nozzle outlet unit 2. The entire nozzle outlet unit 2 can therefore be set completely with a pre-positioning for the production of a specific product, so that in this way, further optimization can be achieved.

However, it should be noted that the position of the deformable sleeve relative to the at least one setting drive 3 is also changed by means of the integration of the pre-positioning into the nozzle outlet units 2. In order to then avoid the adjustments that are necessary in this connection, a support ring 23 assigned to the intermediate module 1 is provided, according to FIG. 8, which ring can be moved in a plane perpendicular to the axial direction X relative to the basic body 24 of the intermediate module 1.

Therefore the at least one setting drive 3 remains on the intermediate module 1 formed from support ring 23 and basic body 24, even when the nozzle outlet unit 2 is changed. In this regard, it is practical to connect the support ring 23, in the assembled state, with the corresponding nozzle outlet unit 2 by means of strews, for example, so that even in the case of an adjustment of the pre-positioning by means of the centering unit 22 and the setting means 18, no further correction or setting of the at least one setting drive 3 is necessary.

FIG. 8 shows a sectional representation with an angling away by 90° in the upper section, in a manner already previously described. Furthermore, in a lower section an intermediate position is shown, so as to clarify the releasable connection between the replaceable nozzle outlet units 2 and the intermediate module 1 with the fastening screws 4. In this regard, the fastening screws 4 extend through the ring-shaped centering unit 22 of the nozzle outlet units 2.

In the case of the previously shown embodiments, the deformable sleeve 8 is held at its upper end, so that during a deformation by means of the setting drives 3, deformation of the deformable sleeve 8 also takes place in the form of tilting about the end-side mounting. For equalization of the tilting movement, the connection elements 5 are connected with the setting drives 3 in an articulated manner, in particular using the connection bolt 6. Furthermore, setting drives 3 must also be arranged on the intermediate module 1 using an articulated connection 25.

Figure 9:
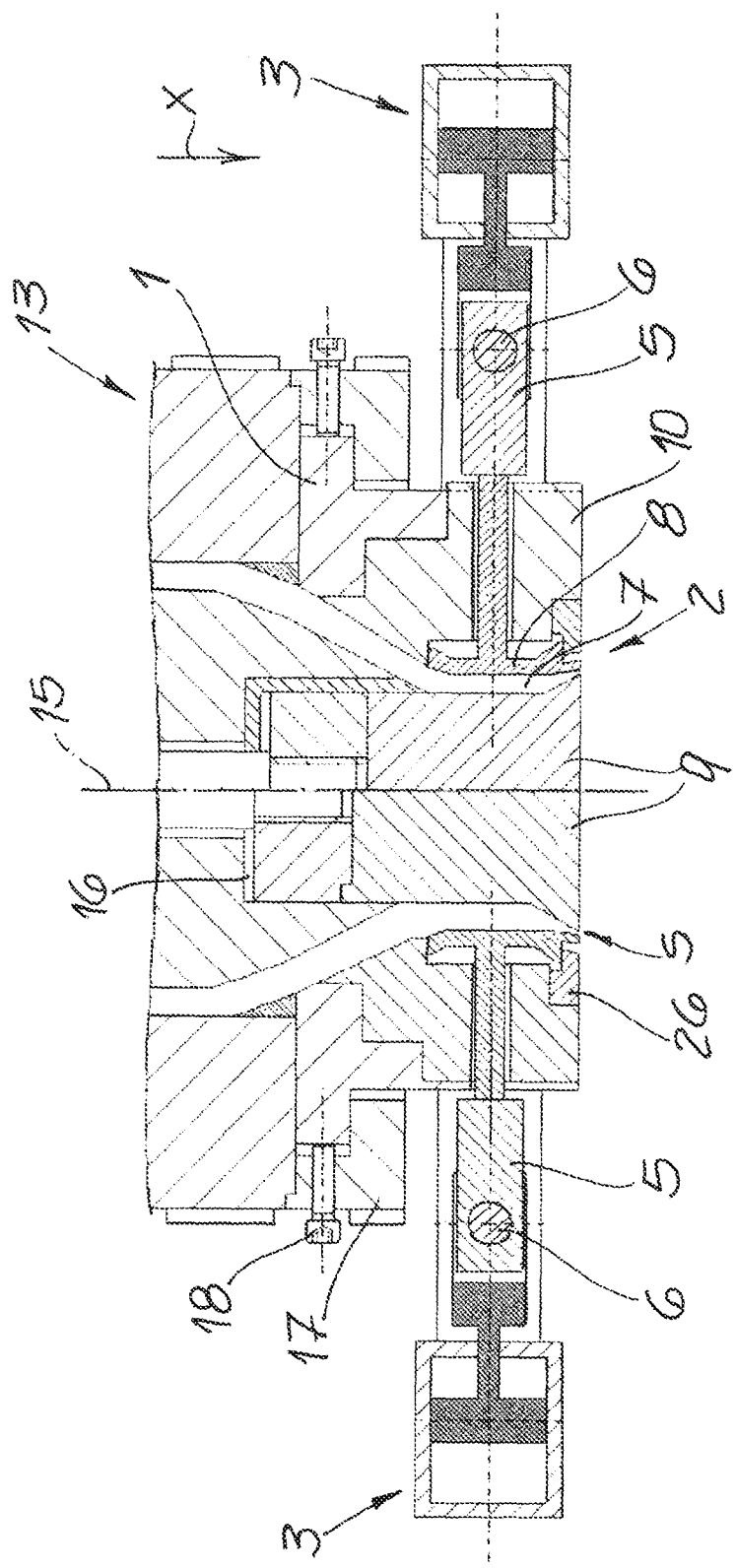

FIG. 9 shows an embodiment in which the deformable sleeve 8 is held on the intermediate module 1 in a horizontally displaceable manner, without a mounting in the sense of clamping, wherein the intermediate module 1 has a support ring 26 on its underside, to guide the deformable sleeve 8.

In the case of the horizontally displaceable holder shown, the deformation of the deformable sleeve 8 can be implemented by means of a purely linear movement, so that it is not necessary to equalize a tilting movement. Therefore, design simplifications such as a fixed placement of the setting drives 3 on the intermediate module 1, for example, are possible. However, a disadvantage is the movement of the deformable sleeve 8 on the support ring 26, which is connected with a limited useful lifetime in operation.

With regard to the mandrel 9, different embodiments are possible within the scope of the invention. Thus, FIG. 8 and FIG. 9 each show a rigid one-piece mandrel 9, which is rigid in the region of the nozzle outlet gap S. In contrast, embodiments of the mandrel 9 having a main mandrel body 9*a* and an adjustable sleeve 9*b* are shown in FIG. 3 to FIG. 7. The adjustable sleeve 9*b* in the exemplary embodiments of FIG. 3 to FIG. 7 can be pre-set using setting screws 27, wherein dynamic adjustment is also possible in addition or alternatively.

Figure 10:
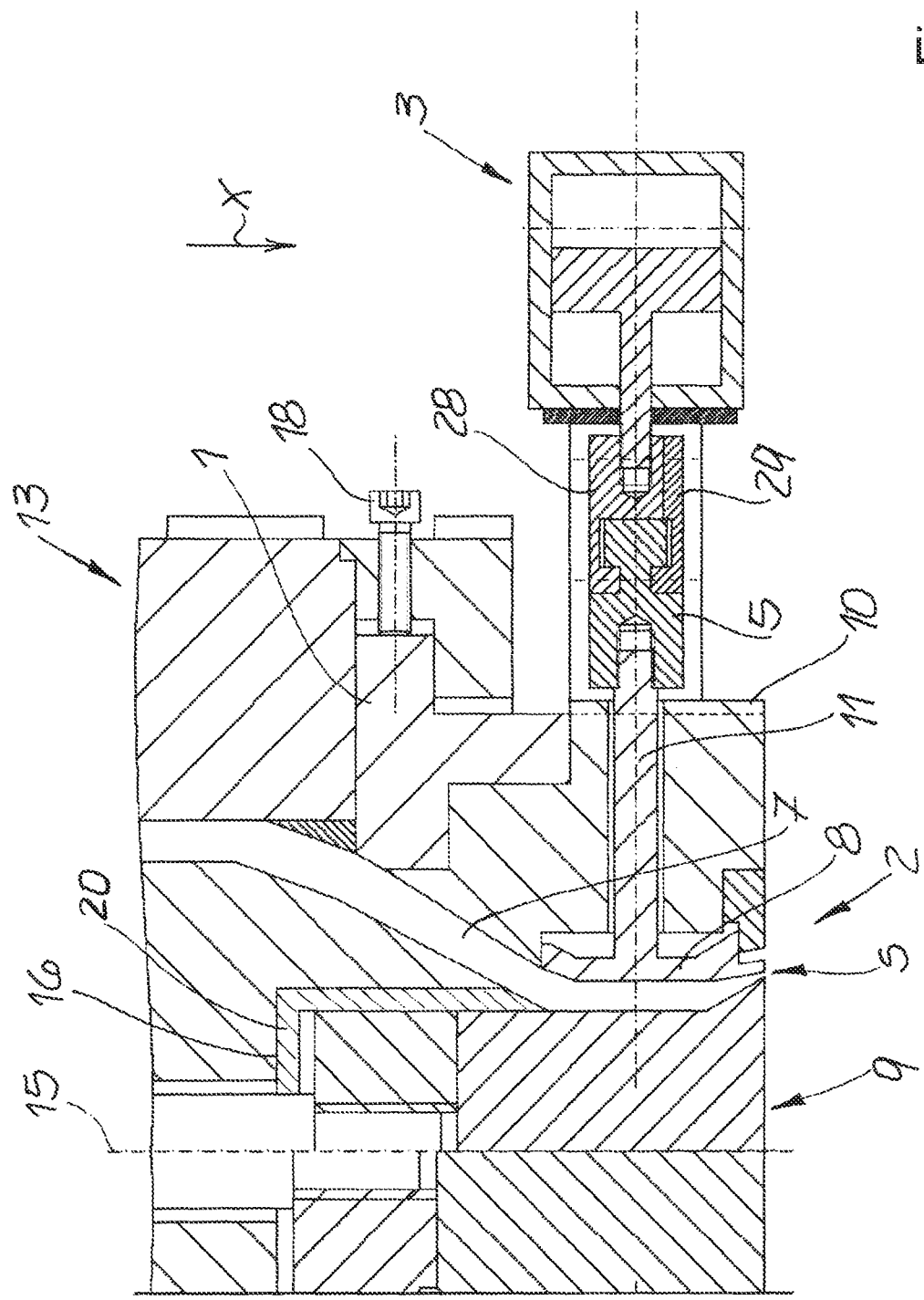

The connection of the connection elements 5 of the nozzle outlet units 2 with the setting drives 3 by means of connection bolts 6, as described above, is merely an example, wherein many different alternative embodiments are possible. As a further example in this regard, FIG. 10 shows a shape-fit connection, in which the connection elements 5 have a fitted collar, in each instance, which is grasped by a claw-like counter-piece 28 having a clamping plate 29, which piece is connected with the setting drive 3.

Furthermore, quick-change systems, in particular spring-loaded quick-change systems, toggle lever systems or the like are also possibilities.

Fundamentally, the invention can also be used in the case of multiple extrusion heads. In this regard, the nozzle outlet units 2 of the multiple extrusion heads can be mounted on a removable carrier for rapid replacement, which carrier can then be installed on or removed from the multiple extrusion head, preferably in one work cycle. In the case of a multiple extrusion head, the individual extrusion heads can each have their own setting drives 3. Alternatively, central setting drives can also be provided for the extrusion heads, which drives then each act on the corresponding force attack points of the extrusion heads in parallel.

In general, the outer mechanical stop 12*b*, in deviation from the embodiments described above, can also be made available by means of the first or the second nozzle outlet unit 2. To clarify this option, reference is made to FIGS. 11A to 11C. FIG. 11A shows a horizontal section as in FIG. 2A and FIG. 2B.

In the case of a replacement of the nozzle outlet unit 2, this unit is separated from the intermediate module 1 after loosening of the connection bolts 6, wherein for this purpose, only the separated nozzle outlet unit 2 is shown in FIG. 11B, and the intermediate module 1 without the nozzle outlet unit 2 is shown in FIG. 11C.

FIGS. 11A to 11C show different embodiments, in each instance, with reference to a center axis, on the left side on the one hand and on the right side on the other hand. In a comparison of FIGS. 11A to 11C, it can be seen that the outer mechanical stop 12*b* is assigned, for maximum pull, to the nozzle outlet unit 2 on the left side, and to the intermediate module 1 on the right side. If, according to the left side of FIGS. 11A to 11C, the outer mechanical stop 12*b* is assigned to the nozzle outlet unit 2, the nozzle outlet units 2 to be exchanged for one another can be coordinated with one another in such a manner that the exchange can take place in a force-free state of the deformable sleeves 8, in other words in the center position, at the same travel position of the setting drives 3.

Although only a few embodiments of the present invention have been shown and described, it is to be understood that many changes and modifications may be made thereunto without departing from the spirit and scope of the invention.

What is claimed is:

1. A nozzle tool system for extrusion blow molding, having an intermediate module (1) and at least a first nozzle outlet unit (2) and a second nozzle outlet unit (2), which units each form an adjustable nozzle outlet gap between a mandrel (9) that extends in an axial direction (x) and a deformable sleeve (8), which units can be connected with the intermediate module (1) as replacements for one another, and which units have a first outlet diameter and a larger second outlet diameter, which diameters are different from one another, wherein at least one setting drive (3) for reversible deformation of the sleeve (8) is arranged on the intermediate module (1) and can be connected with the deformable sleeve (8) by way of a releasable coupling arrangement, wherein the first nozzle outlet unit (2) delimits a first setting path of the setting drive (3) using at least one inner mechanical stop (12*a*), and the second nozzle outlet unit (2) delimits a second setting path, which is greater than the first setting path, of the setting drive (3), using at least one inner mechanical stop, and wherein the inner mechanical stops (12*a*) are spaced apart from the at least one setting drive (3) and are configured for a pressing setting movement of the at least one setting drive (3), by a contact surface, in each instance, of the corresponding nozzle outlet unit (2) so as to limit travel of the deformable sleeve (8).

2. The nozzle tool system according to claim 1, wherein an outer mechanical stop (12*b*) is assigned to the intermediate module (1) for a pulling setting movement.

3. The nozzle tool system according to claim 1, wherein an outer mechanical stop (12*b*) is assigned to the corresponding nozzle outlet unit (2) for a pulling setting movement.

4. The nozzle tool system according to claim 1, wherein the at least one setting drive (3) has different setting positions for a center position of the deformable sleeves (8) of the first nozzle outlet unit (2), on the one hand, and the second nozzle outlet unit (2), on the other hand.

5. The nozzle tool system according to claim 1, wherein the first nozzle outlet unit (2) and the second nozzle outlet unit (2) extend along the axial direction (x), over an identical height with reference to the corresponding nozzle outlet gap.

6. The nozzle tool system according to claim 1, wherein the first nozzle outlet unit (2) and the second nozzle outlet unit (2) each have an adjusting configured to static pre-position the deformable sleeve (8) relative to the intermediate module (1).

7. The nozzle tool system according to claim 6, wherein the first nozzle outlet unit (2) and the second nozzle outlet unit (2) are adjustable by movement in a plane perpendicular to the axial direction (x) or by tilting or by pivoting relative to the intermediate module (1).

8. The nozzle tool system according to claim 6, wherein the at least one setting drive (3) is arranged to be movable relative to a basic body (24) of the intermediate module (1).

9. The nozzle tool system according to claim 8, wherein the intermediate module (1) comprises a support ring (23) that can be moved relative to the basic body (24), in a plane perpendicular to the axial direction (x), which ring carries the at least one setting drive (3).

10. The nozzle tool system according to claim 1, wherein the mandrel (9) and/or the deformable sleeve (8) can be moved along the axial direction (x), using setting movements regulated by an electronic controller.

11. The nozzle tool system according to claim 10,
wherein the mandrel (9) of the first nozzle outlet unit (2) and the mandrel (9) of the second nozzle outlet unit (2) have a different diameter at a rear-side guide shaft section (19), and
wherein an adapter sleeve (20) is provided for equalization.

12. The nozzle tool system according to claim 1, wherein the deformable sleeve (8) of the first nozzle outlet unit (2) and the deformable sleeve (8) of the second nozzle outlet unit (2) have a different length along the axial direction (x).

13. The nozzle tool system according to claim 1, wherein a third nozzle outlet unit is provided, which has a rigid sleeve or a statically adjustable sleeve that delimits the nozzle outlet gap(S).

14. The nozzle tool system according to claim 1, wherein precisely one setting drive (3) is provided, which acts on force attack points that lie opposite one another for a symmetrical deformation of the deformable sleeve (8).

15. The nozzle tool system according to claim 1, wherein precisely two setting drives (3) that lie opposite one another are provided.

16. The nozzle tool system according to claim 1, wherein the at least two nozzle outlet units (2) have an identifier and can be differentiated using the identifier.

17. An extrusion blow molding arrangement having an extrusion head and the nozzle tool system according to claim 1.

18. The extrusion blow molding system according to claim 17, having a data memory of a controller, wherein specific and at least partially different parameters are stored in the data memory for the first nozzle outlet unit (2) and the second nozzle outlet unit (2).

\* \* \* \* \*